(No Model.) 2 Sheets—Sheet 1.

F. M. BOOKWALTER & W. W. TYLER.
WATER WHEEL.

No. 493,964. Patented Mar. 21, 1893.

WITNESSES:
H. M. Plaisted
J. B. Ernest

INVENTORS
Francis M. Bookwalter,
and Wm. W. Tyler,
BY H. A. Toulmin
THEIR ATTORNEY.

THE NORRIS PETERS CO., PHOTO-LITHO., WASHINGTON, D. C.

(No Model.) 2 Sheets—Sheet 2.

F. M. BOOKWALTER & W. W. TYLER.
WATER WHEEL.

No. 493,964. Patented Mar. 21, 1893.

WITNESSES:
H. M. Paish
J. B. Ernest

INVENTORS
F. M. Bookwalter
Wm. W. Tyler
BY
H. A. Toulmin
THEIR ATTORNEY.

UNITED STATES PATENT OFFICE.

FRANCIS M. BOOKWALTER AND WILLIAM W. TYLER, OF SPRINGFIELD, OHIO, ASSIGNORS TO THE JAMES LEFFEL & COMPANY, OF SAME PLACE.

WATER-WHEEL.

SPECIFICATION forming part of Letters Patent No. 493,964, dated March 21, 1893.

Application filed August 1, 1892. Serial No. 441,781. (No model.)

*To all whom it may concern:*

Be it known that we, FRANCIS M. BOOKWALTER and WILLIAM W. TYLER, citizens of the United States, residing at Springfield, in the county of Clark and State of Ohio, have invented certain new and useful Improvements in Water-Wheels, of which the following is a specification, reference being had therein to the accompanying drawings.

Our invention relates to certain new and useful improvements in water wheels.

A particular object of our invention is to provide an improvement over that part of our invention, set forth in application Serial No. 388,635, filed April 13, 1891, which relates to the extension of the partition walls of the chutes or the gates over a portion of the buckets, whereby the water is conveyed well into the buckets, for a purpose hereinafter to appear; such extension of the gates being applicable to cylinder and register gates, or any other gates other than pivoted gates, the latter being embraced in the application above referred to.

Other features of our invention will also be hereinafter fully described and claimed.

Figure 1:
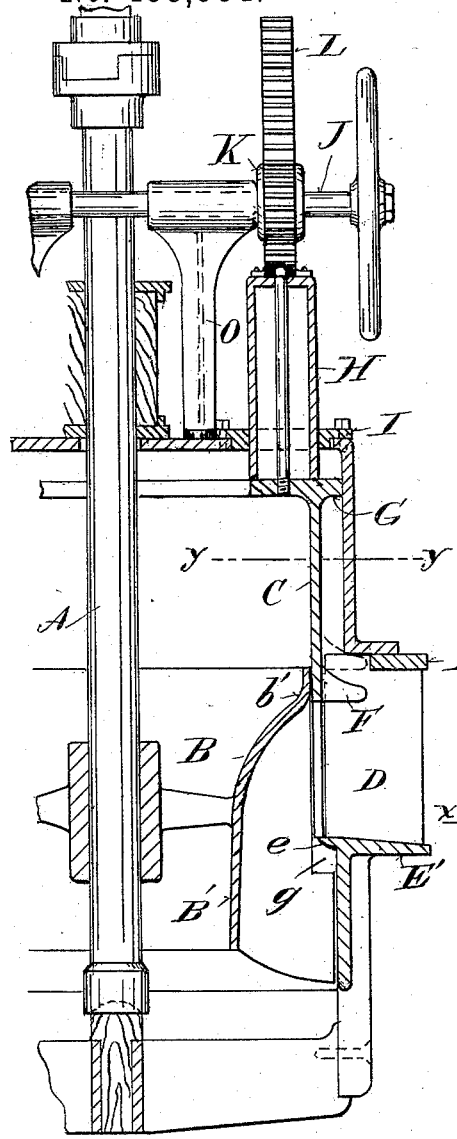
Figure 3:
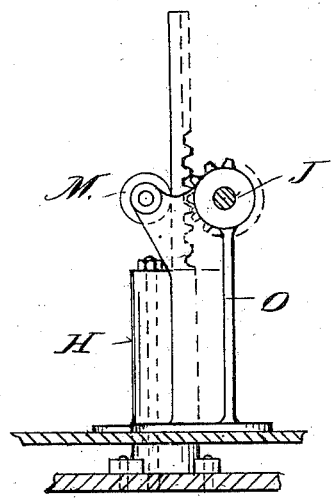
Figure 2:
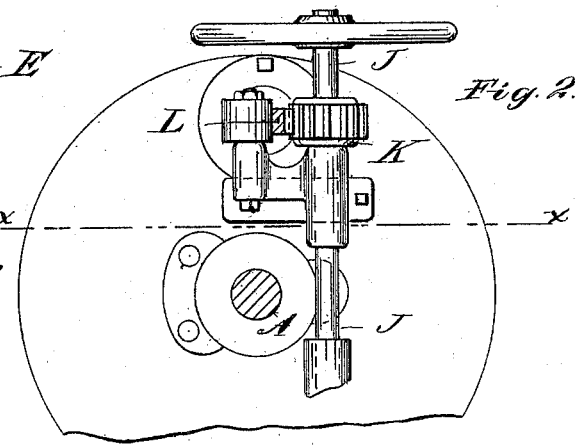
Figure 4:
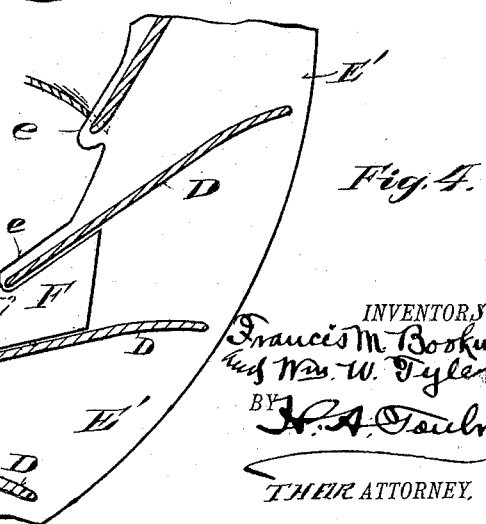
Figure 5:
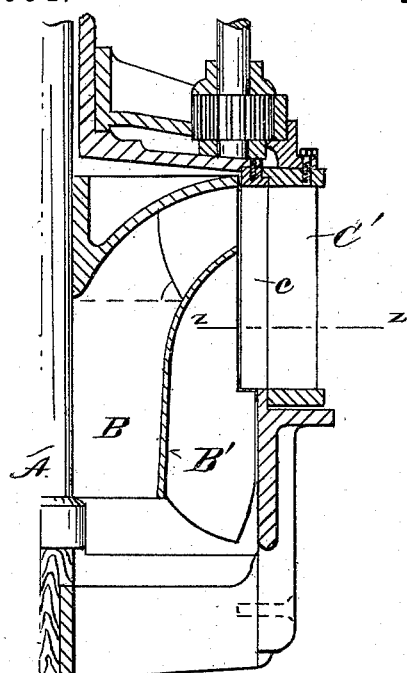
Figure 8:
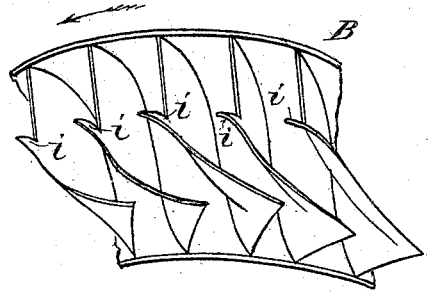
Figure 7:
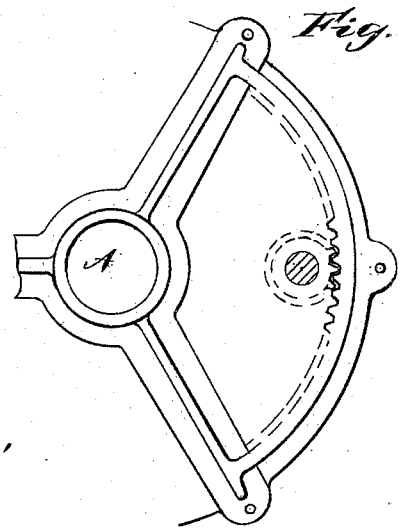
Figure 6:
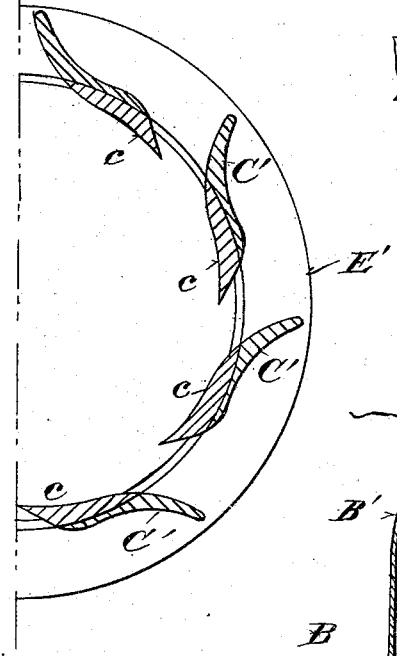

In the accompanying drawings on which like reference letters indicate corresponding parts; Figure 1, represents a vertical sectional view through a wheel proper and its casing, and a cylindrical gate operating therewith; Fig. 2, a plan view of the casing and operative devices for the gate; Fig. 3, a side view of said devices, the section being taken on the line $x$ $x$ of Fig. 2; Fig. 4, an enlarged plan view of the chutes in section, the section being taken on the line $y$ $y$ of Fig. 1, and a portion of the cylinder gate for said chutes with its matching projection; Fig. 5, a similar view to Fig. 1, showing a double diameter wheel with register gates; Fig. 6, a section on the line $z$ $z$ of Fig. 5, without the wheel proper; Fig. 7, a plan portion of the gate wheel or spider for said register gate; Fig. 8, a perspective of a portion of the wheel proper showing a turned forward lip on each bucket; and Fig. 9, a fragment of the casing, and a bucket with a cut down portion of the outer diameter.

The letter A designates a vertical shaft on which is mounted the wheel proper B, the same being shown as having one set of buckets in Fig. 1, and two sets of buckets in Fig. 5, but both wheels being of the double diameter type described in the application above referred to.

In Fig. 1, a cylinder gate C, operates vertically to regulate the supply of water to the wheel proper, and in Fig. 5 the register gates C, operating past matching chute walls $c$, admit the water to the buckets.

In Fig. 4, the chute walls D are between the guide rims E E' and have their inner ends extending beyond the plane of the outer edges of the wheel proper. This is likewise the case with the chute walls $c$, as shown in Figs. 5 and 6. That is to say, the chute walls extend over a portion of the buckets, (the outer portion in this case,) whereby the water is carried by said chutes inward beyond the outer edge of the buckets, and nearer than would otherwise be the case, to the downward deflecting shell B', which forces it downward into that part of the wheel which is of larger diameter. These inwardly projecting walls forming the sides of the water passages, whether such passages be chutes or gates proper, form perpendicular guides or directing surfaces, the inner ends of which overhang the outer edges of the buckets and guide the water sidewise beyond the line at which the water first descends into the said buckets. That is to say, the water passing over the edge of the guide rim as in Fig. 5, will pass directly downward upon the shouldered edges of the buckets, while the inwardly projecting partition walls $c$ between the passages continue their guiding action beyond the line of said rim. In Fig. 4 these inner ends of the walls D, are provided with the horizontal projections $e$ which serve to form a matching joint with the cylinder gate, but between said projections the water passes directly downward upon the wheel buckets as before described. These projections $e$ may be only sufficient width of shoulder to form the matching joint, and as shown in the drawings, are enlarged to represent clearly the overlapping of the gate upon the same.

It will be observed, that in this present view of our invention, we employ the cylinder or the register gate,—that is to say, we employ as within our invention, all gates other than what are called "pivoted gates," which latter type of gates enters into the novelty of the organization, in the invention set forth in our application above referred to, in that part which relates to the overhanging of a part of the wheel proper by a portion of the gates themselves.

It will further be understood that the course taken by the water, as above stated,—that is to say, its passage downward into the larger part of the wheel, enables it to so evade the centrifugal force or influence due to the high speed of the wheel, that the water more rapidly passes into such portion of the wheel, and therefore gives increased efficiency and practical utility to the wheel.

It will further be noted that in connection with register gates, there are fixed or stationary parts or walls for guiding the water, passages between which are called chute walls, and in Figs. 5 and 6 herein, the chute walls are designated by the letter c, and are inside of the register gates called C'. In some instances, the chutes are on the outside of the register gate. This is immaterial for the purposes of this invention, and so chutes on the inside of the register gates only, are illustrated.

For the purpose of this invention, it makes no difference whether the side walls which extend over the buckets of the wheel proper, constitute the side walls of the chutes or the gates, as long as they guide the water into the wheel proper and extend over the buckets, constituting a passage without a bottom, as it might be expressed; that is, the said walls at their inner ends are not connected by a rim or horizontal wall between their inner overhanging ends, but allow the water to drop down at once upon the buckets of the wheel proper while the perpendicular or side walls guide it beyond the point or line at which the lower currents of it thus pass directly down into the bucket.

It is also true that in connection with cylinder gates, chutes are used. In Figs. 1 and 4 herein, these chute walls are designated D, as above referred to. Gates, so understood, we term non-pivoted gates, as distinguished from "pivoted" gates, as referred to in the above named application. This organization, resulting in the above described action of the water, has been found by practical tests to give an increased velocity of the water through the wheel, and thereby a much greater power and efficiency.

In Fig. 4, the guide rim E' is provided with shelves or projections, e, extending inward and forming bases for the inner projecting portions of the chute walls. The remainder of the space between these projections allows the direct descent of the water upon the shouldered edge of each bucket as before described. The cylinder gate operating with these chutes, is provided with outward projections F, Figs. 1 and 4, which assist in guiding water to the buckets. The necessary play or clearance between said projections F and chutes D, as shown in Fig. 4, is closed completely when the gate is in its lower position, by the overlapping of the inward projections e, of the lower guide rim, and the outward projections F. This is clearly shown in Fig. 4 by the superimposed portion of the cylinder gate above the lower guide rim. Thus an easily made and effective closing joint is provided.

The weight of a cylinder gate is considerable, and in order to balance it, a projecting flange G receives the pressure of the water, and the area is so adjusted with regard to the weight of the gate and the area of the projections F, that the gate is practically balanced in its operation, under a known head or fall for which it is designed. For a different form or pressure of water, however, the proportion between the two surfaces requires alteration, since the weight of the gate is constant and does not change with the change of pressure on the projections F and the balancing flange G. This constant weight of the gate destroys the proper ratio of the said surfaces under a certain pressure, and in order to balance the gate for a different pressure, the ratio between the surfaces must be changed. We effect this by means of auxiliary surfaces, consisting of tubes H, bolted or otherwise secured to the cylinder gate, as shown in Fig. 1, and extending through a closely fitting gland I, mounted in the top of the casing. The pressure of the water upon the top of the cylinder H, of which there are one or more, increases the tendency of the gate to drop. In other words, it lessens the effective surface of the flange G, as the pressure on the cylinders is reverse to that on the flange. For a different head of water, a different size of cylinder may be used, and a matching gland. The glands of the various sizes maintain a constant outer diameter which fits within the opening of the casing, while the inner diameter corresponds with the cylinder used. The peculiar ratio of the parts may thus be adjusted to different heights of fall in the same wheel, by simply changing the size of the cylinders and their matching gland. The flange G fits tightly against the inside of the casing, and as before mentioned, is proportioned according to the pressure. The downward tendency of the gate is increased by the suction due to the water passing into the buckets, whereby the pressure on the underside of the projections F, is less than on the upper side, when the gate is partially lowered.

Referring to Fig. 1, it will be seen that the upper end of the shell B', is curved upward at b' before it reaches the upper guide rim, and that the gate when lowered to the position shown, forms substantially an outward continuation of the shell or the bucket, and so guides the water into the wheel. As ordinarily designed with this form of gate, a partial closing of the gate forms a recess at the back thereof, into which the water eddies and swirls, thus checking the velocity and diminishing the efficiency. The outer surface of the upper portion $b'$, of the shell as shown by the section in Fig. 1, allows of adjusting the gate up and down near its upper limit of motion, without the formation of such back currents or eddies inside of the gate. When the gate is partially lowered, there are thus no back eddies formed behind the gate; when raised to its full height, the water glides into the buckets past such vertical and rounded portion of the shell. In other words, this upper portion $b'$ of the shell, in its relation to the gate, is designed to secure the greatest efficiency when the gate is at less than its maximum opening, instead of when fully open, as is ordinarily the case.

The gate is raised by a pinion shaft J, the pinion K on which shaft, meshes with the rack L secured to the cylinder H before mentioned, or to other convenient part of the gate. A roller M, at the back of the rack opposes the pressure of the pinion, and a standard O mounted on the casing, supports the roller and pinion shaft. This device is in pairs and on opposite sides of the wheel shaft A, as indicated in Fig. 2.

In the register gate illustrated in Figs. 5, 6 and 7, the operating mechanism for the gate is the usual pinion and rack arrangement, as readily understood by referring to the drawings. We have described the outer portions $C'$ as being movable, while the inner portions $c$, forming the chutes, are stationary, being part of the casing. If desired the movable part may be the latter member.

Referring to Fig. 8, a modified form of lip $i$ is shown on the portion of the bucket extending beyond the inner diameter. The lip in this figure is bent forward nearly or quite horizontal, in the direction that the wheel runs, whereby the entering water is sheared or cut by the edges, which run faster than the water itself. They thus slice off the water entering through the chutes, instead of striking more or less obliquely thereon, on account of the high velocity of the wheel.

Figure 9:
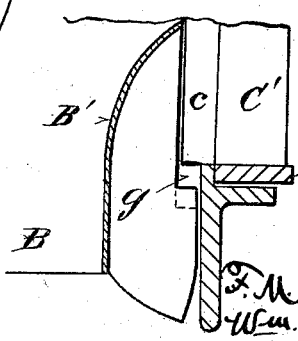

In Fig. 9, it will be seen that the outer edge of the bucket is cut down as far inward as the inner diameter, leaving an annular space, $g$, below the inner ends of the chutes or partition walls, all around the casing. The object of this is to effect a better distribution of the water as it passes along the guiding surface of one chute wall, and forward under the succeeding chute. The dotted lines in this figure indicate that this shouldered portion of the bucket may be cut down and curved forward in precisely a similar manner to that shown and described in Fig. 8. That is to say, this lip portion, $i$, thus bent forward as described, may be applied either to the shoulder of the bucket shown in Fig. 5, in which case it will be directly adjacent to the bottom of the chute; or it may be applied to the form of bucket shown in Figs. 1 and 9, in which case it will be more or less distant below the inner portion of said chute walls, and afford an annular space or distributing chamber for the water leaving each wall and passing under the next forward one. We wish to be understood as claiming this bent forward lip portion $i$, broadly.

Having thus fully described our invention, what we claim as new, and desire to secure by Letters Patent, is—

1. The combination with a casing, and a wheel having buckets with an edge extending from its periphery inward, of guide walls forming passages for the water delivered to the wheel, the said walls of which passages overhang the outer portion of said buckets, and the bottom wall of which is cut away between the side walls to allow the water to drop downward, while the side walls direct it inward well within the wheel.

2. In a water wheel, the combination with a wheel proper of two diameters forming a shoulder on the buckets and thus providing an entering edge for each bucket to receive the water from its side and from above, and a casing for such wheel proper, of guide walls forming water passages, the side walls of which overhang the outer portion of said buckets, and the bottom wall of which is cut away between said side walls, substantially as described.

3. In a water wheel, the combination with a wheel proper formed in two diameters of buckets, each providing substantially a vertical and a horizontal entering edge, and a casing for said wheel proper, of a cylinder gate operating vertically past said vertical edges of the buckets, the casing being provided with partition walls forming the water passages to said wheel proper, the inner ends of which walls extend over the shouldered portions of the buckets, and a bottom for said passages having lateral flanges at said overhanging ends, and cut away between, substantially as shown and described.

4. In a water wheel, the combination with a casing and a wheel proper mounted therein having buckets formed in two diameters to constitute a shouldered entering edge on the buckets themselves, side walls forming water passages to said buckets extended over said shouldered edge of the buckets, and the bottom of the passages cut away between said walls, the shoulder of the bucket being located below said bottom wall so as to leave a space between the overhanging walls through which the water passes before it strikes said bucket shoulder.

5. In a water wheel, the combination with a casing and a wheel proper mounted therein, the shell of which is curved outward and upward substantially as shown and described, of a cylinder gate and operative devices therefor, the gate co-operating as a guide with the said outward and upward curve of the shell.

6. In a water wheel, the combination with a casing and a wheel proper mounted therein, the shell on which the buckets are mounted being curved upward and rounded at the junction of the buckets with said shell, of a cylinder gate mounted in said casing and operating with said buckets and designed to effect the greatest efficiency of the wheel when partially closed, as shown, and admit of maximum opening, substantially as and for the purpose described.

7. In a water wheel, the combination with a casing and a wheel proper mounted therein, of a cylinder gate provided with a flange to receive the upward pressure of the water and thus resist the downward tendency of the gate under a known head, of one or more auxiliary surfaces consisting of interchangeable pieces adapted to be mounted on said gate and exposed to the downward pressure of the water, whereby the gate may be balanced under other pressures than that for which the parts were proportioned, by substituting different auxiliary surfaces thereon.

8. In a water wheel, the combination with a casing and a wheel proper mounted therein, of a cylinder gate having a flange to receive the upward pressure, and auxiliary pressure portions consisting of cylinders passing through said casing and adapted to receive the downward pressure of the water, whereby the gate may be balanced.

9. In a water wheel, the combination with a casing and a wheel proper mounted therein, of a cylinder gate having a flange adapted to receive the upward pressure of the water and proportioned to balance the gate under a known pressure or head, of a cylinder detachably mounted on said gate and extending upward through said casing to afford an auxiliary surface exposed to the downward pressure of the water, and a detachable gland of constant diameter with an opening according to the size of the cylinder, whereby the gate may be balanced under other pressures or heads than the one for which it is designed.

10. In a water wheel, the combination with a casing, a wheel proper and a cylinder gate therefor, the latter being provided with a flange to balance the downward tendency of the gate under a certain pressure or head, of a detachable cylinder mounted on said gate and exposed to the downward pressure, a gland therefor mounted on the casing, a rack secured to said cylinder, and a shaft and pinion meshing with said rack to operate said gate up and down.

11. In a water wheel, the combination with a casing a wheel proper and a cylinder gate having a flange to receive the upward pressure, of a detachable cylinder secured to said gate and adapted to receive the downward pressure of the water and a glandular opening in said casing for said cylinder, a rack secured thereto, a pinion meshing with the rack and a shaft therefor, a roller at the back of said rack, and a bracket standard to support said roller and pinion in operative position, substantially as described.

12. In a water wheel, a wheel proper formed in two diameters, whereby the outer edge of the bucket is provided with a substantially horizontal shoulder, said shouldered portion being bent forward more or less toward the horizontal, substantially as described.

13. In a water wheel, a wheel proper provided with buckets, the outer edge of each bucket being in two diameters, the larger one below, and the shouldered portion thus formed being cut down along the inner diameter and extending forward substantially horizontal at its forward end, and blending in its downward and backward curve into the surface of the bucket, substantially as and for the purpose described.

14. In a water wheel, the combination with a casing, and chute walls extending inward beyond the inner walls of said casing, substantially as described, of a wheel proper formed in outer and inner diameters, whereby a shoulder is formed, the bucket being cut downward at said inner diameter opposite said shoulder, and the cut-down portion bent forward to leave a space below said inner chute walls, substantially as described.

In testimony whereof we affix our signatures in presence of two witnesses.

FRANCIS M. BOOKWALTER.
WILLIAM W. TYLER.

Witnesses:
H. M. PLAISTED,
WARREN M. MCNAIR.